A. B. BREEZE.
BALL SEAT.
APPLICATION FILED SEPT. 5, 1919.
1,401,107.
Patented Dec. 20, 1921.
Fig. 1.
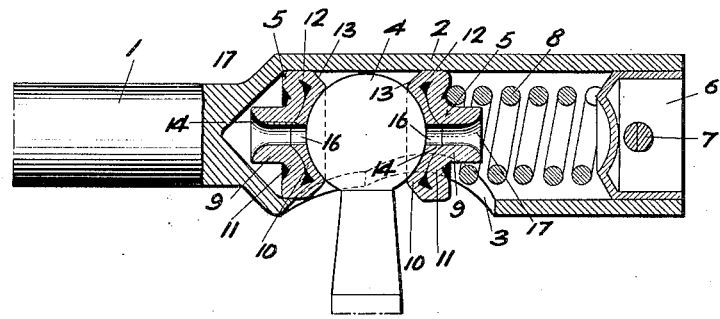
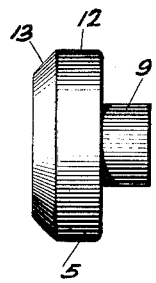
Fig. 2.
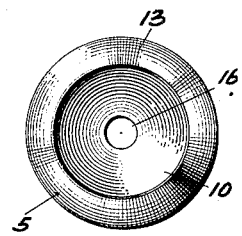
Fig. 4.
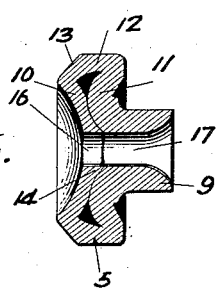
Fig. 3.
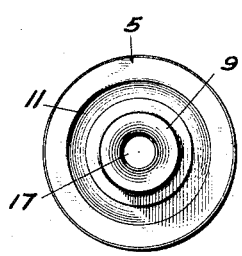
Fig. 5.
Alfred B. Breeze, Inventor
By Word & Word
Attorneys

UNITED STATES PATENT OFFICE.

ALFRED B. BREEZE, OF CINCINNATI, OHIO, ASSIGNOR TO THE CINCINNATI BALL CRANK COMPANY, OF CINCINNATI, OHIO, A CORPORATION OF OHIO.

BALL-SEAT.

1,401,107. Specification of Letters Patent. Patented Dec. 20, 1921.

Application filed September 5, 1919. Serial No. 321,945.

*To all whom it may concern:*

Be it known that I, ALFRED B. BREEZE, a citizen of the United States, and residing at Cincinnati, in the county of Hamilton and State of Ohio, have invented a new and useful Improvement in Ball-Seats, of which the following specification is a full disclosure.

My invention relates to an improvement in socket blocks or seats as parts of a ball and socket or universal joint, and particularly to a type as used in a drag link device or steering rod as applied to motor vehicles or automobiles.

An object of the invention is to form a single sheet of metal into a disk-like structure of double wall or ply thickness, having its walls or layers pressed inwardly from the periphery of the disk and centrally abutting against each other, one side wall thereof centrally recessed, providing a concave seat for a ball and the other or second wall annularly corrugated and centrally flanged outwardly to reinforce said wall, and provide a centrally projecting lug or boss and spring-receiving socket around the boss.

Another object of the invention is to provide a socket block or seat formed of a sheet of metal pressed into form for the production of a strong and durable product with smooth and hard seat surfaces resulting in economy in the cost of manufacture, and in a product susceptible of rapid production in large quantities with the elimination of special machining and finishing, as is necessary in forming the same kind of product from a solid piece of material.

With a view of attaining these and other objects, which will be apparent from the following description, the invention consists in the features of construction shown in the accompanying drawings, forming a part of this specification, and in the drawings like characters of reference denote corresponding parts throughout the several views, of which—

Figure 1 is a sectional view through one end of a steering reach rod with my improved socket blocks or seats as parts of a universal ball and socket joint mounted within the tube socket of said rod.

Fig. 2 is a side elevation of the improvement.

Fig. 3 is a central section thereof.

Fig. 4 is a side or end elevation, and

Fig. 5 is an elevation of the opposite side.

Referring to the drawings, (1) indicates a steering reach comprising a rod having a tubular end (2) which is of larger diameter than the middle portion of the rod. The tubular end of the rod has its wall formed with a key hole shaped aperture (3) through which the neck of crank or ball arm extends, with the ball (4) at the end of the arm engaged between a pair of oppositely disposed socket blocks or pieces (5—5) mounted within the tubular end. The rear end of the reach rod is closed by a plug (6) which may have a threaded engagement with the tube for adjusting the plug, or the plug may be held in place by a cotter pin (7) engaged through the plug and through alined apertures in the wall of the tube. A spring (8) is disposed between the plug (6) and adjacent socket block (5) for yieldingly holding the parts of the joint together. The inner socket block is engaged against a shoulder at the inner end of the tube. It is desirable for the purpose of confining the end of the spring centrally against and upon the block (5) to engage the end of the spring over a projection or hub (9) extending from the block. From the foregoing, the purpose of the block is very apparent, and compares in contour to a type of block having a large commercial use, made or machined from a solid piece of material.

The block herein, thus representing a disk-like structure of plural-ply thickness, is formed from an integral or single piece of sheet metal bent, pressed and formed into a shape comprising a pair of adjacent side walls or layers (10—11), joined together by a peripheral or rim portion (12). The wall or layer (10) is cupped or dished centrally inwardly toward the opposite wall or layer (11) adapting its outside surface to provide a concave seat or socket for receiving the ball of a crank arm. The wall (10) from the periphery of the concaved portion is bent angularly outward providing an annular conical portion (13) connecting with the rim portion (12). The opposite wall or layer (11) is bent into the form of an annular corrugation providing a central concave surface on its inner side as a recess into which a correspondingly shaped or tapering central annular projection (14) extending from the inner side of the wall (10), engages. Thus the central portion of the wall (11) provides a backing for the central or seat portion of the wall (10). The wall (11) centrally and annularly is pressed or bent outwardly providing a tubular lug or hub extension (9). The wall (10) has a central aperture (16) registering with the bore (17) of the hub extension (9) providing a central opening through the block or disk as a port opening for a lubricant to pass through.

In the process of forming the block from a single piece of sheet metal, the forming of the central or concaved portion of the wall (10) as the first step of the forming process is made from the central part of the blank of the material employed. The original surface film or coating for a seat surface area is thus not roughened or injured as at the points or lines along which a fold of the metal is made. This provides for a very smooth, polished and hard seat surface in the finished product which requires no further finishing or grinding, abuttingly engaging and socketing the central portion of the two walls, joining the two walls as a unit with the wall (10) at a point receiving the greatest strain, and subjected to the greatest wear. The annular corrugation of the wall (11) provides an annular rim in the outside of the wall as a seat or socket for the end of a spring engaged on the hub or boss (9).

Having described my invention, I claim:

A ball seat formed of a sheet of metal, comprising a double walled portion, the walls pressed together, and a rim portion annularly integrally uniting said walls, one wall having its face side centrally concaved and the second wall having a boss centrally projecting from its face side, and an annular recess about the base of said boss.

In witness whereof, I hereunto subscribe my name, as attested by the two subscribing witnesses.

ALFRED B. BREEZE.

Witnesses:
 L. A. BECK,
 M. BARRON.